United States Patent [19]

Ugawa

[11] Patent Number: 4,716,681
[45] Date of Patent: Jan. 5, 1988

[54] WINDOW REGULATOR FOR AN AUTOMOTIVE VEHICLE

[75] Inventor: Satoru Ugawa, Hadano, Japan

[73] Assignee: Nissan Motor Co., Ltd., Yokohama, Japan

[21] Appl. No.: 794,843

[22] Filed: Nov. 4, 1985

[30] Foreign Application Priority Data

Nov. 24, 1984 [JP] Japan .................................. 59-248332

[51] Int. Cl.$^4$ .............................................. E05F 15/16
[52] U.S. Cl. ......................................... 49/349; 49/374
[58] Field of Search .................. 49/352, 360, 374, 349, 49/376, 375

[56] References Cited

U.S. PATENT DOCUMENTS

| | | | |
|---|---|---|---|
| 1,922,057 | 8/1933 | Menton | 49/425 |
| 2,082,541 | 6/1937 | Haberstamp | 49/425 |
| 2,214,328 | 9/1940 | Haberstamp | 49/425 |
| 2,379,923 | 7/1945 | Roethel | 49/375 |
| 3,078,120 | 2/1963 | Faber | 49/227 |
| 4,314,692 | 2/1982 | Brauer | 49/349 |
| 4,494,336 | 1/1985 | Ishii | 49/352 |
| 4,648,206 | 3/1987 | Moriya et al. | 49/375 |
| 4,669,222 | 6/1987 | Ujihara et al. | 49/352 |

FOREIGN PATENT DOCUMENTS 3545083  6/1986  Fed. Rep. of Germany ........ 49/352

Primary Examiner—Kenneth J. Dorner
Assistant Examiner—Gerald A. Anderson
Attorney, Agent, or Firm—Schwartz, Jeffery, Schwaab, Mack, Blumenthal & Evans

[57] ABSTRACT

An automotive window regulator comprises a guide rail assembly and a wire type drive unit. The guide rail assembly consists of a pair of guide rails which are joined together by a plurality of beams prior to installation of the guide rail assembly on a door inner panel. The drive unit comprises a wire and a movable bracket for fixing a portion of the wire to a window pane. The movable bracket is disposed right under the center of gravity of the window pane or as close as possible to same.

7 Claims, 3 Drawing Figures

WINDOW REGULATOR FOR AN AUTOMOTIVE VEHICLE

BACKGROUND OF THE INVENTION

1. Field of the Invention

The present invention relates in general to automotive vehicle doors and more particularly to a window door regulator for raising and lowering a door glass or window pane.

2. Description of the Prior Art

An X-arm type window regulator is widely used for an automotive vehicle frameless door as for example disclosed in the Japanese Provisional Utility Model Publication No. 54-3742 and includes a pair of front and rear guide rails arranged nearly vertically and secured to a door inner panel, a pair of guide rollers rotatably mounted on a door glass and movably received in the guide rails so that the door glass is movable upwardly and downwardly being guided by the guide rails, and an X-arm type drive unit by which the door glass is driven to move upwardly and downwardly.

In the prior art window regulator, the guide rails and the drive unit are formed as independent constituent parts or assemblies and separately mounted on a door panel by separate fastening means. Due to this, installation of the window regulator requires not only a difficult installation work but a delicate adjusting work, otherwise the door glass does not move smoothly.

Further, in the prior art window regulator, the point at which a driving force is transferred from the drive unit to the door glass traces a curved line upon movement of the door glass. Due to this, the door glass tends to swing forwardly and rearwardly to cause play of the guide rollers and the guide rails.

SUMMARY OF THE INVENTION

In accordance with the present invention, there is provided a novel and improved window regulator for an automotive door. The window regulator comprises a guide rail assembly fixedly attached to a door inner panel and having a pair of beams for joining the guide rails together, and a wire type drive unit for driving the window pane to move upwardly and downwardly.

The above structure is quite effective for overcoming the above noted disadvantages inherent in the prior art device.

It is accordingly an object of the present invention to provide a window regulator for an automotive vehicle door which can effect smooth movement of a door glass without requiring a delicate and difficult adjusting work.

It is another object of the present invention to provide a window regulator of the above mentioned character which can be installed with an easy installation work.

It is a further object of the present invention to provide a window regulator of the above mentioned character which is assuredly prevented from causing play of its guide rollers and guide rails.

BRIEF DESCRIPTION OF THE DRAWINGS

The features and advantages of the automotive window regulator according to the present invention will become more clearly appreciated from the following description taken in conjunction with the accompanying drawings, in which.

DETAILED DESCRIPTION OF THE PREFERRED EMBODIMENTS

Figure 1:
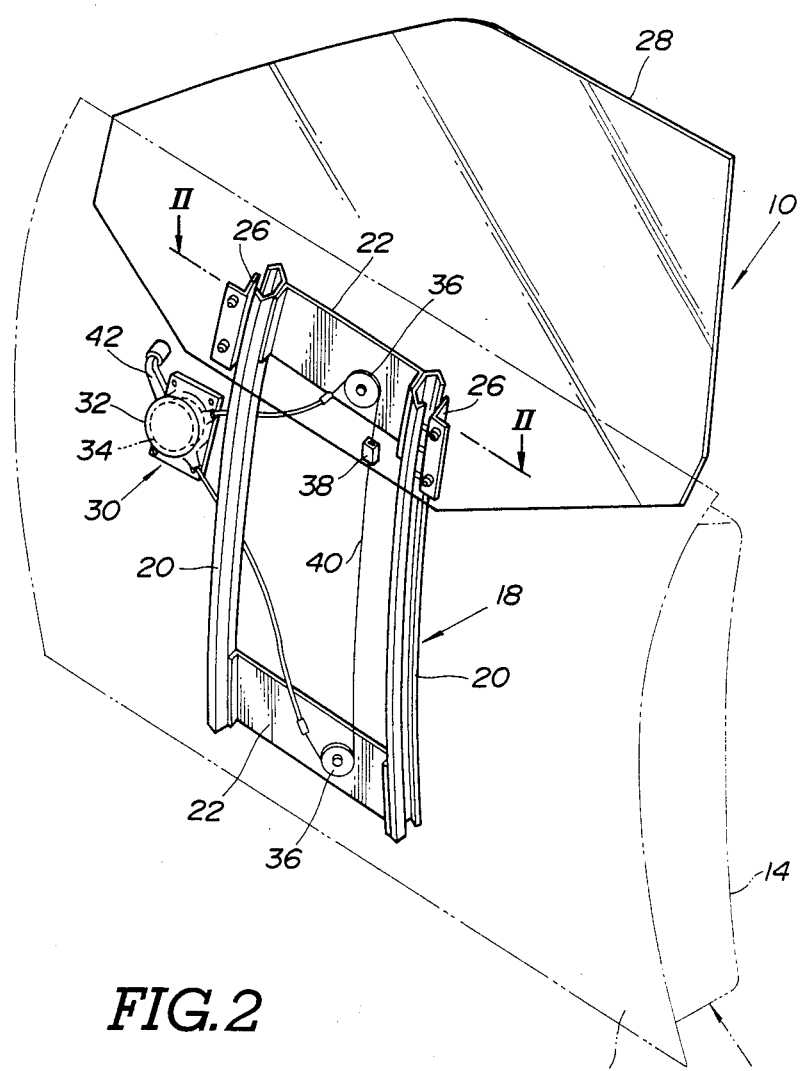
FIG. 1 is a perspective view of an automotive door incorporating a window regulator according to the present invention.
Figure 2:
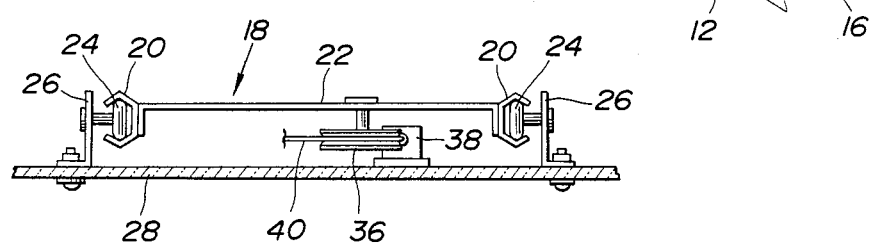
FIG. 2 is a sectional view taken along the line II—II of FIG. 1.

Referring first to FIGS. 1 and 2, generally indicated by the reference numeral 10 is an automotive vehicle door including an outer panel 12 and an inner panel 14 which are joined together to form a hollow door body 16. The inner panel 14 is formed with various access holes (not shown) which are used for assembly works, as is well known in the art.

Within the door body 16 a guide rail assembly 18 is disposed and secured to the inner door panel 14. The guide rail assembly 18 consists of a pair of parallel guide rails 20 disposed nearly vertically or disposed to extend in the roof-to-floor direction of the vehicle and a pair of parallel upper and lower beams 22 disposed horizontally between the guide rails 20 to interconnect the same, i.e., the upper beam 22 interconnects the upper end portions of the guide rails 20 while the lower beam 22 interconnecting the lower end portions.

Within the guide rails 20 a pair of guide rollers 24 are movably disposed and which are in turn rotatably mounted through brackets 26 on a door glass 28 so that up-and-down movement of the door glass 28 is guided by the guide rails 20.

A wire type drive unit for driving the door glass 28 is generally indicated by the reference numeral 30. The drive unit 30 is of the conventional type and consists of a drum base 32 secured to the door inner panel 14, a winding drum 34 rotatably mounted on the drum base 32, a pair of pulleys 36 rotatably mounted on the respective upper and lower beams 22, a movable bracket 38 secured to the door glass 28 to move together therewith, a wire 40 having a portion fixedly attached to the movable bracket 38 and placed around the pulleys 36 and the winding drum 34 in such a manner as to have opposite end portions which are respectively wound around the winding drum 34 in the reverse directions, and a manually operated regulator handle 42 for driving the winding drum 34 in one and the other directions. In the above, the location of the movable bracket 38 on the door glass 28, i.e., the point at which a driving force is transferred from the wire 40 to the door glass 28 is set right under the center of gravity of the door glass 28 or as close as possible to same, whereby to prevent rotation of the door glass 28.

In operation, turning of the regulator handle 40 of the drive unit 30 causes the winding drum 34 to rotate in one or the other direction, with the upper portion of the wire 40 being wound up on the winding drum 34 or wound off from same. By this, the movable bracket 38 is caused to move upwardly or downwardly between the pulleys 36, with the door glass 28 being driven to move upwardly or downwardly.

From the foregoing, it is to be understood that the window regulator of this invention can be installed in place with ease by the effect of employment of the guide rail assembly 18 and the wire type drive unit 30, that is, the installation of the window regulator is attained by first attaching the guide rail assembly 18 and the drive unit 30 to the door inner panel 14 with the wire 40 being wound around the pulleys 36 and the winding drum 34, then mounting the guide rollers 24 in the guide rails 20 and finally fixing a predetermined portion of the wire 40 to the movable bracket 38.

It is further to be understood that the window regulator of this invention does not require any delicate adjustment, particularly as to installation of the window glass 28, since by the effect of the guide rails 20 preassembled to form an integral unit, adjustment of the forward and rearward inclination of the guide rail assembly 18 or the guide roller brackets 36 is only necessitated to complete installation of the window regulator of this invention.

It is further to be understood that the window regulator of this invention can assure smooth movement of the window glass 28 since by the employment of the wire type drive unit 30, the point at which a driving force is transferred from the drive unit 30 to the window glass 28 is immovable or stationary relative to the window glass 28. This is quite effective for preventing rotation of the window glass 28 and therefore play of the guide rails 20 or the guide rollers 24.

Figure 3:
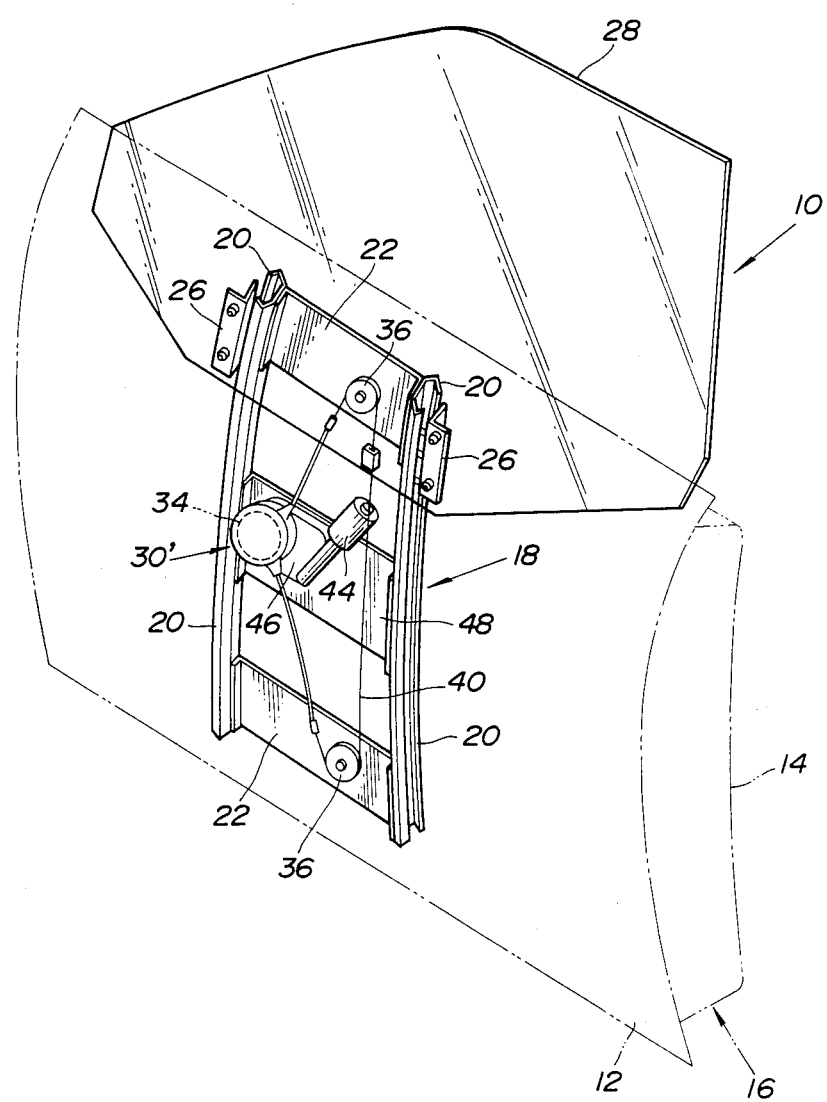
FIG. 3 is a view similar to FIG. 1 but showing another embodiment of the present invention.

FIG. 3 shows a modification in which like or corresponding parts to those of the previous embodiment are designated by the same reference numerals.

This embodiment mainly differs from the previous embodiment in that the winding drum 34 is adapted to be driven by an electric motor 44 in place of the manually operated regulator handle 42 and that a drive unit 30' including the electric motor 44 and a reduction gear 46 is mounted on an intermediate beam 48 additionally provided between the guide rails 20 to interconnect the intermediate portions of same. With this modification, the drive unit 30' can be installed on the guide rail assembly 18 prior to installation on the door 10, whereby to make further easier the installation of the window regulator on the door 10.

What is claimed is:

1. A window regulator for raising and lowering a window pane in an automotive vehicle door having an inner panel, comprising:
    a preassembled integral unit guide rail assembly fixedly attached to the inner panel and comprising a pair of parallel guide rails spaced from each other, said guide rails disposed nearly vertically and having upper end portions and lower end portions, a pair of first and second beams disposed nearly horizontally to respectively interconnect said upper end portions and said lower end portions, each of said first and second beams having a pulley rotatably mounted thereon, and a third beam interconnecting portions of said guide rails intermediate between said upper end portions and said lower end portions;
    a pair of guide rollers rotatably mounted on said window pane and movably engaged with said guide rails, respectively; and
    a wire type drive unit engaging said pulleys for driving the window pane;
    said wire type drive unit comprising a drum base attached to said third beam, a winding drum rotatably mounted on said drum base, pulleys rotatably mounted on said first and second beams, respectively, a movable bracket attached to said window pane to move together therewith, a wire having a portion fixedly attached to said movable bracket and placed around said pulleys and said winding drum in such a manner as to have opposite end portions which are respectively wound around said winding drum in the reverse directions, and means for driving said winding drum to rotate.

2. A window regulator as set forth in claim 1, wherein said driving means comprises an electric motor and a reduction gear mounted on said third beam.

3. A window regulator as set forth in claim 1, wherein said movable bracket is located right under the center of gravity of said window panel.

4. A window regulator as set forth in claim 1, wherein said movable bracket is disposed as close as possible to the center of gravity of said window pane.

5. A window regulator as set forth in claim 1, wherein said wire type drive unit is disposed between said guide rails.

6. A window regulator as set forth in claim 5, wherein said wire type drive unit is disposed between said first and second beams.

7. A window regulator for raising and lowering a window pane in an automotive vehicle door having an inner panel, comprising:
    a preassembled integral unit guide rail assembly fixedly attached to the inner panel and comprising a pair of parallel guide rails spaced from each other and a pair of first and second beams extending between and fixedly attaching said guide rails to each other, each of said beams having a pulley rotatably mounted thereon;
    a pair of guide rollers rotatably mounted on said window pane and movably engaged with said guide rails, respectively; and
    a wire type drive unit engaging said pulleys for driving the window pane;
    said pair of guide rollers comprising a first roller group rotatably mounted on a first window mounting bracket slidably engaging one of said pair of guide rails and a second roller group rotatably mounted on a second window mounting bracket slidably engaging the other one said pair of guide rails, wherein said roller groups and window mounting brackets are disposed on outer edges of said guide rail assembly.

* * * * *